No. 877,712. PATENTED JAN. 28, 1908.
R. P. HASSLER.
FERTILIZER DISTRIBUTER.
APPLICATION FILED JAN. 29, 1907.

2 SHEETS—SHEET 1.

No. 877,712. PATENTED JAN. 28, 1908.
R. P. HASSLER.
FERTILIZER DISTRIBUTER.
APPLICATION FILED JAN. 29, 1907.

2 SHEETS—SHEET 2.

Inventor
R. P. Hassler

Witnesses
By
Attorneys

UNITED STATES PATENT OFFICE.

RUDOLPH P. HASSLER, OF LUVERNE, MINNESOTA.

FERTILIZER-DISTRIBUTER.

No. 877,712.　　　Specification of Letters Patent.　　　Patented Jan. 28, 1908.

Application filed January 29, 1907. Serial No. 354,698.

*To all whom it may concern:*

Be it known that I, RUDOLPH P. HASSLER, a citizen of the United States, residing at Luverne, in the county of Rock, State of Minnesota, have invented certain new and useful Improvements in Fertilizer-Distributers; and I do hereby declare the following to be a full, clear, and exact description of the invention, such as will enable others skilled in the art to which it appertains to make and use the same.

This invention relates to fertilizer distributers and more particularly to that class in which the feed mechanism includes a cylinder or beater and a comb device which cooperates with the cylinder, and the primary object of my invention is to provide a novel and more efficient device or mechanism of the class described.

In carrying out my invention, I arrange the comb head above the cylinder and forwardly thereof, and extend the teeth of the comb downwardly and rearwardly in a straight line with their lower and rear ends resting lightly in engagement with the cylinder but out of the path of the teeth thereon.

Figure 1:
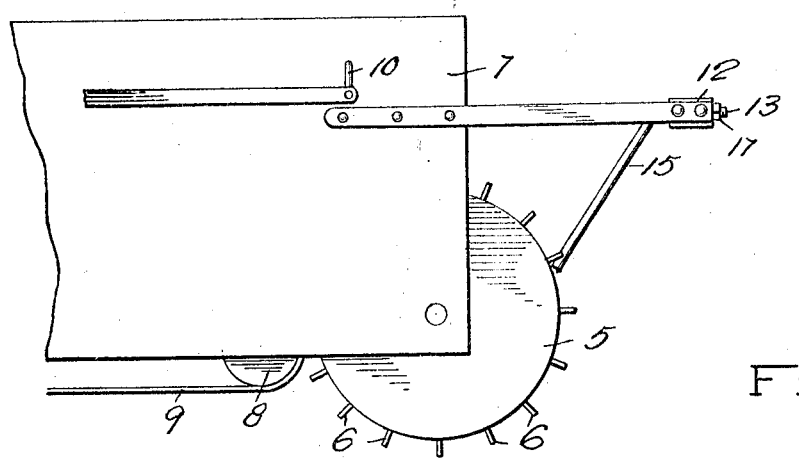
Figure 2:
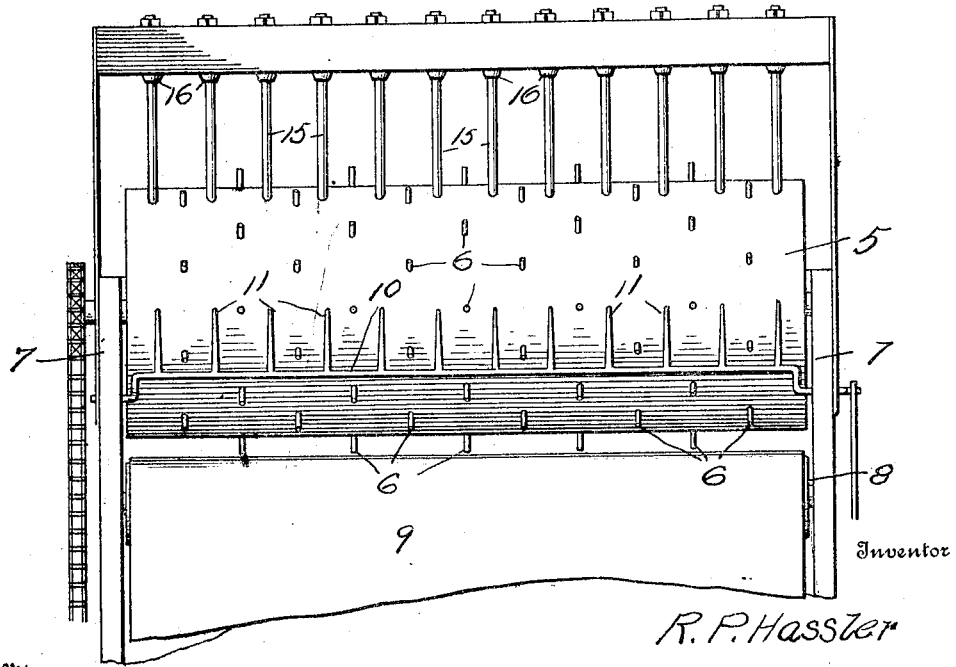
Figure 3:
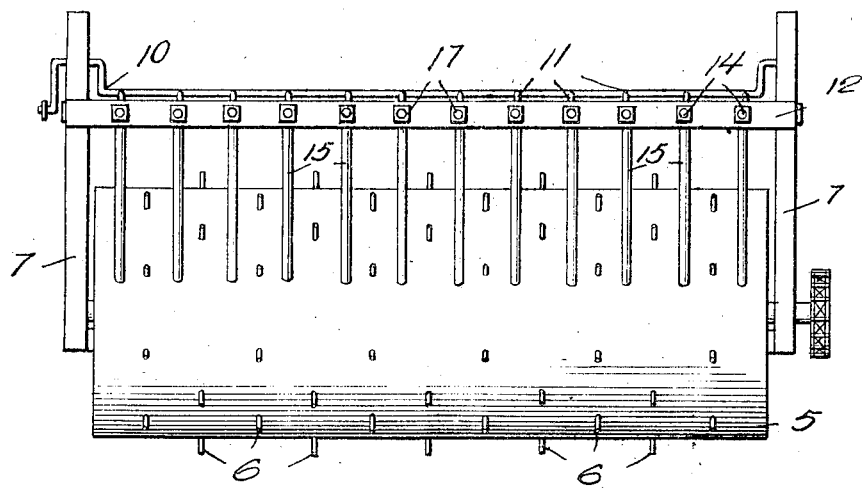
Figure 4:
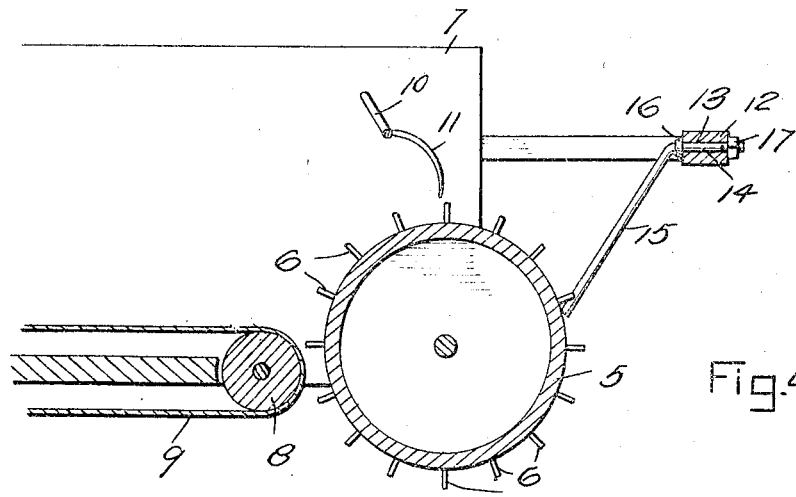

In the accompanying drawings, Figure 1 is a side elevation of the fertilizer distributing mechanism constructed in accordance with my invention. Fig. 2 is a top plan view thereof. Fig. 3 is a rear elevation, and Fig. 4 is a detail vertical longitudinal sectional view therethrough, taken in a line with one of the comb teeth.

Referring more specifically to the drawings, the feed mechanism is shown as comprising a cylinder 5, upon which is formed a plurality of teeth 6, which are preferably located in a number of continuous series around the cylinder. The toothed cylinder 5 is journaled for rotation between the side boards 7 of the distributer in the usual manner, and may be driven by any desired form of gear connections. Journaled in the front of the cylinder 5 is a roller 8, around which passes a feed belt 9. A crank shaft 10 is journaled in the side boards of the distributer and directly above the cylinder 5, and to the crank portion of this shaft are secured rake teeth 11 which are moved upwardly and downwardly and forwardly and rearwardly as the shaft is rotated.

Extending across the rear end of the distributer, and in a plane above and rearwardly of the cylinder 5, is a head 12, and this head is provided with a number of openings 13, through each of which is engaged the threaded tang 14, of a resilient comb tooth 15. Upon the tang 14 of each tooth, is formed a collar 16, which abuts the forward edge of the head 12, and upon the threaded or rear end of the tang is engaged a nut 17, which bears against the rear edge of the said head, thereby serving to rigidly connect the tooth with the head. From the collar portion 16 of each tooth, the tooth is turned downwardly and forwardly in a straight line as clearly shown in Figs. 1 and 4 of the drawings, and has its lower and forward end in engagement with the cylinder 5 and between a certain pair of the continuous tooth series thereon.

From the above description of my invention, it will be observed that the teeth of the continuous tooth series pass upon each side of the lower and front ends of the adjacent teeth 15, and it will be understood that by this respective arrangement of the teeth 6 and the teeth 15, the fertilizing material is thoroughly loosened before being dropped upon the ground.

What is claimed is:

A fertilizer distributing mechanism comprising a driven drum having teeth thereon, said teeth being arranged in a plurality of continuous series extending around the drum, a crank shaft arranged above the drum and forwardly of the vertical plane occupied by the axis thereof, rake teeth fixed upon the crank shaft, the said shaft being designed to be rocked to oscillate the teeth above the upper and forward portion of the drum, a comb head supported rearwardly beyond the drum and in a plane above the same, and teeth carried by the head and projecting downwardly and forwardly with their free ends resting against the cylinder and between the series of teeth thereon.

In testimony whereof, I affix my signature, in presence of two witnesses.

RUDOLPH P. HASSLER.

Witnesses:
WM. JACOBSEN, Jr.,
D. M. MARR.